United States Patent
Hatula et al.

(10) Patent No.: US 8,751,703 B2
(45) Date of Patent: Jun. 10, 2014

(54) INTERRUPT EVENT MANAGEMENT

(75) Inventors: Ari Petteri Hatula, Oulu (FI); Mika Tapani Lehtonen, Oulu (FI)

(73) Assignee: Broadcom Corporation, Irvine, CA (US)

( * ) Notice: Subject to any disclaimer, the term of this patent is extended or adjusted under 35 U.S.C. 154(b) by 100 days.

(21) Appl. No.: 13/356,041

(22) Filed: Jan. 23, 2012

(65) Prior Publication Data

US 2013/0166794 A1    Jun. 27, 2013

(30) Foreign Application Priority Data

Dec. 23, 2011 (GB) .................................. 1122271.8

(51) Int. Cl.
*G06F 3/00* (2006.01)
*G06F 13/00* (2006.01)

(52) U.S. Cl.
USPC ........... 710/48; 710/5; 710/8; 710/15; 710/32

(58) Field of Classification Search
None
See application file for complete search history.

(56) References Cited

U.S. PATENT DOCUMENTS

| | | | |
|---|---|---|---|
| 5,390,305 A | 2/1995 | Takahashi et al. | 395/379 |
| 6,237,058 B1 | 5/2001 | Nakagawa | 710/260 |
| 7,328,294 B2 | 2/2008 | Kim et al. | 710/260 |
| 7,581,052 B1 | 8/2009 | Solomita et al. | 710/267 |
| 7,610,425 B2 | 10/2009 | Solomita et al. | 710/260 |
| 2007/0043347 A1 | 2/2007 | Solomita et al. | 606/33 |
| 2008/0082713 A1* | 4/2008 | Tsuruta | 710/268 |
| 2010/0030939 A1* | 2/2010 | Litovtchenko et al. | 710/263 |

FOREIGN PATENT DOCUMENTS

| | | | |
|---|---|---|---|
| EP | 0 510 617 A1 | 4/1992 | |
| JP | 58080741 A | 5/1983 | |

* cited by examiner

*Primary Examiner* — Scott Sun
(74) *Attorney, Agent, or Firm* — Stanton IP Law (57) ABSTRACT

An interrupt management apparatus is provided for managing interrupt events generated by, for example, peripheral devices and computing modules. The interrupt management apparatus has an event decoder for receiving one or more interrupt signals from one or more interrupt sources and for decoding a received interrupt signal to produce control data relating to an interrupt event. The apparatus also has a sequence memory for storing one or more sequences, a sequence including one or more steps for handling one or more interrupt events, and one or more sequencers for interpreting one or more steps of a sequence stored in the sequence memory, the one or more sequencers being arranged to receive said control data from the event decoder. This enables the apparatus to manage said interrupt events without assistance from a central processing unit.

23 Claims, 6 Drawing Sheets

INTERRUPT EVENT MANAGEMENT

TECHNICAL FIELD

The present invention relates to the management of interrupt events. In particular, the present invention provides an apparatus and a method to assist in the handling of interrupt events using one or more sequencers. The present invention may be applied in a variety of computing architectures, such as those within mobile or static electronic devices.

BACKGROUND

An interrupt is a signal that is generated by a component of a computing device or a peripheral device to 'interrupt' the processing of a processing unit. The processing unit is then able to deal with an interrupt event relating to the component or peripheral device before returning to the interrupted processing. Interrupt signals are generally asynchronous, and as such difficult to predict and manage. In a typical system, when a processing unit receives an interrupt signal, the present processing is interrupted and in its place program code is loaded from memory and processed by the processing unit to handle the associated interrupt event. This program code typically comprises an interrupt handling routine provided by an operating system. For example, a computing device comprising a modem may connect to a network. In this case, an interrupt signal may be generated by a modem device when a network connection is made or lost (an interrupt event); an interrupt handling routine may thus update control variables to indicate a current status of the connection and, if necessary, reconnect.

In more advanced application-specific integrated circuits (ASICs) and so-called system-on-chip (SoC) configurations, there may be multiple components, multiple peripheral devices and multiple processing units. Many of these systems are designed to provide real-time responses. Each interrupt source may generate a variety of interrupt signals, and different processing units may require different interrupt handling functions. For example, an interrupt event for a particular system module may require a dedicated interrupt handling routine, which in turn may require a dedicated service on each processing unit.

Moreover, a computing device may comprise a number of interconnected subsystems, with each subsystem having a dedicated processing unit and one or more computing components. A peripheral device may have couplings to more than one subsystem. In this case, different interrupt systems relating to each subsystem may be required as it is difficult to share interrupt signals between different processing units. The complexity of such systems may also be difficult to manage if each subsystem is performing different operations in parallel. For example, it may be difficult to accurate map the dependencies between the subsystems during use, making it difficult to design and implement interrupt handling systems.

U.S. Pat. No. 7,328,294 B2 describes an interrupt system for handling interrupt events in a multiprocessor system. This publication describes the typical problems encountered in a real time system with multiple interrupt sources. It describes a solution involving an interrupt controller that can receive input from a variety of interrupt sources, such as peripheral components and peripheral interfaces. Characteristics of an interrupt signal are then used by the interrupt controller to select a processing unit to run a routine for handling the associated interrupt event.

U.S. Pat. No. 7,610,425 B2, also published as U.S. Pat. No. 7,581,052 B1 and US 2007/0043347 A1, describes an interrupt daemon that monitors the interrupt signal load among a number of processing units that results from an initial mapping of the interrupts to the processing units. The interrupt daemon determines whether there is a sufficient imbalance of the interrupt signals among the processing units and, if so, triggers a reassignment routine that generates a new mapping of the interrupt signals among the processing units. A similar technique is described in U.S. Pat. No. 6,237,058 B1.

While these solutions offer some improvement, the complexity of managing interrupts in electronic or computing systems with multiple components and/or processing units remains. For example, the interrupt signal load at a system-wide level is maintained even though interrupt distribution among processing units is modified. Existing solutions also require a number of software and/or hardware redesigns making them difficult to implement.

There is thus a need in the art for an improved interrupt management system that can manage high interrupt loads, is flexible, and is easy to implement in a large variety of systems. In particular, there is a need for interrupt management systems that are particularly suited to the requirements of complex embedded and mobile systems.

SUMMARY

In accordance with an exemplary embodiment, there is provided an interrupt management apparatus comprising an event decoder for receiving one or more interrupt signals from one or more interrupt sources and for decoding a received interrupt signal to produce control data relating to an interrupt event, a sequence memory for storing one or more sequences, a sequence comprising one or more steps for handling one or more interrupt events, and one or more sequencers for interpreting one or more steps of a sequence stored in the sequence memory, the one or more sequencers being arranged to receive said control data from the event decoder.

In accordance with an exemplary embodiment, there is provided a computing module comprising an apparatus comprising an event decoder for receiving one or more interrupt signals from one or more interrupt sources and for decoding a received interrupt signal to produce control data relating to an interrupt event, a sequence memory for storing one or more sequences, a sequence comprising one or more steps for handling one or more interrupt events, and one or more sequencers for interpreting one or more steps of a sequence stored in the sequence memory, the one or more sequencers being arranged to receive said control data from the event decoder, and a module interface coupled to said one or more sequencers and said sequence memory, the module interface being arranged to send and/or receive data over a data bus.

In accordance with an exemplary embodiment, there is provided a computing system comprising one or more central processing units and an apparatus comprising an event decoder for receiving one or more interrupt signals from one or more interrupt sources and for decoding a received interrupt signal to produce control data relating to an interrupt event, a sequence memory for storing one or more sequences, a sequence comprising one or more steps for handling one or more interrupt events, and one or more sequencers for interpreting one or more steps of a sequence stored in the sequence memory, the one or more sequencers being arranged to receive said control data from the event decoder, the event decoder of said apparatus being arranged to receive one or more interrupt signals from one or more interrupt sources on behalf of said one or more central processing units.

In accordance with an exemplary embodiment, there is provided a method for managing interrupt events comprising receiving an interrupt signal from an interrupt source at an event decoder and handling an interrupt event relating to said interrupt signal received by the event decoder. The handling is achieved by retrieving one or more steps of a sequence from a sequence memory and interpreting said one or more steps of the sequence on a sequencer.

Further features and advantages of the invention will become apparent from the following description of preferred embodiments of the invention, given by way of example only, which is made with reference to the accompanying drawings.

DETAILED DESCRIPTION

The embodiments described herein are suitable for use in managing interrupt events in computing systems. They enable distributed interrupt processing and reduce interrupt loading on one or more processing units.

Certain embodiments are particularly suited for use in digital ASICs and SoC configurations. For example, digital ASICs and SoC configurations such as wireless communication devices comprising one or more wireless baseband modems and central processing units (CPUs) are typically multi-function systems having several real-time functions running contemporaneously. In these systems there may be one or more current operation modes. These operation modes may be selectable. Each operation mode may have its own set of interrupt signals and interrupt sources, leading to high interrupt loading on processing units within the system. For example, a low-speed data transfer mode may use a Global System for Mobile Communications (GSM) modem for wireless communications and a high-speed data transfer mode may use a high speed modem, such as a 3rd Generation (3G) or Long Term Evolution (LTE) modem, for wireless communications. Both operation modes typically make use of one or more CPUs and associated hardware accelerator logic controlled by the CPUs. For mobile computing architectures there is also the constraint of low power use, as only battery power may be available for long periods of time.

Figure 1:
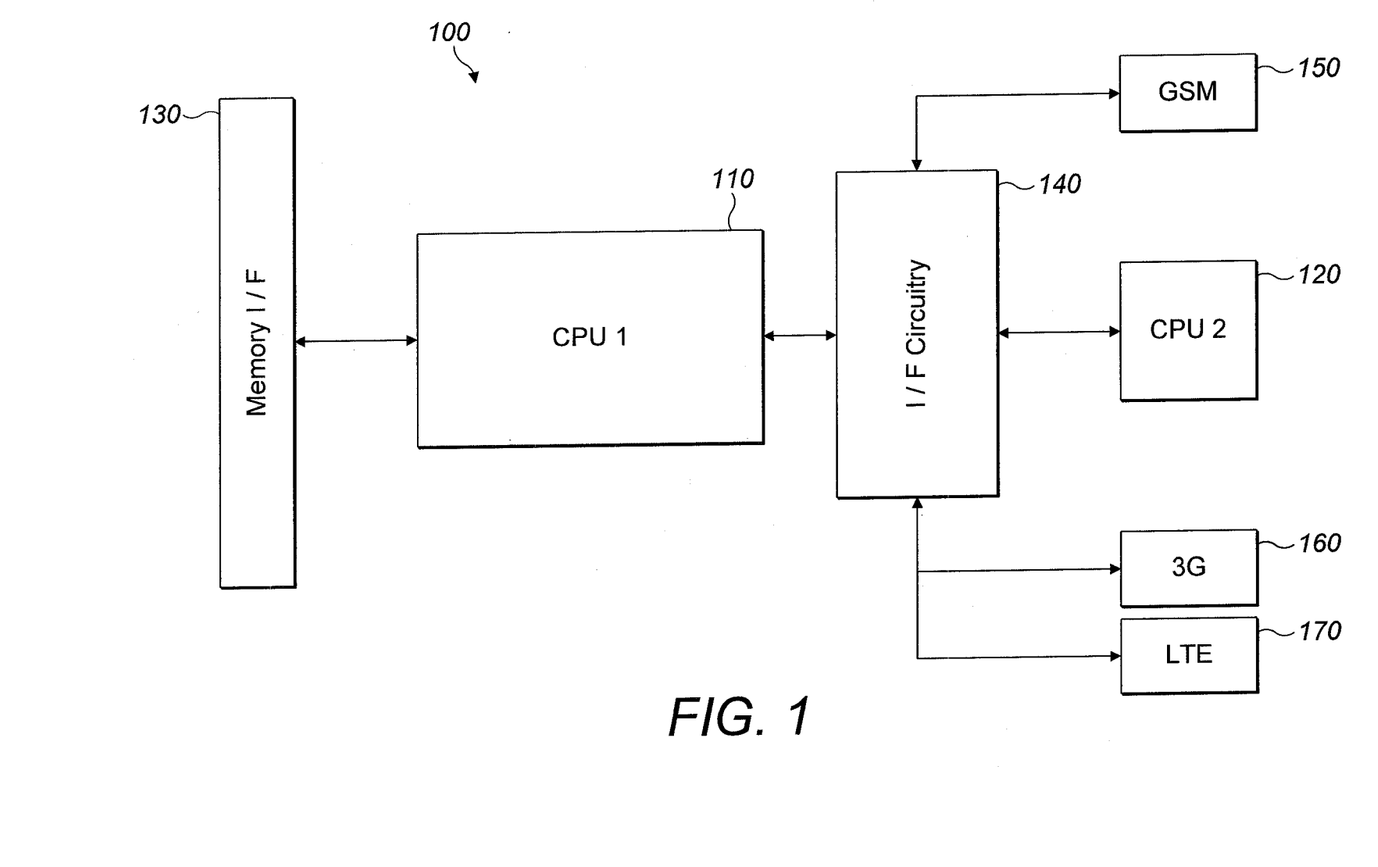
FIG. 1 is a simplified schematic diagram showing certain components of an exemplary computing architecture.

FIG. 1 shows some of the electronic components used in a mobile computing ASIC. Certain components have been omitted for ease of explanation and the configuration of FIG. 1 should not be seen as limiting. The architecture 100 of FIG. 1 comprises a first layer CPU 110. This may comprise a layer-1 (L1) CPU with one or more processing cores. Dual or quad-core CPUs may be used. Each core of the first layer CPU 100 may have a data cache and an instruction cache. Further cache memory may be used. The first layer CPU 100 is coupled to a memory interface 130, which may comprise a high-speed bus for coupling memory to said CPU. The architecture 100 of FIG. 1 further comprises a second layer CPU 120 coupled to the first layer CPU 110 via interface circuitry 140. Hence, the architecture of FIG. 1 comprises a plurality of processing units. The second layer CPU 120 comprises a dedicated sub-system CPU; in this case, an application-specific instruction-set processor (ASIP). An ASIP has an instruction set tailored to a specific application, in the present example this application comprises the modulation and demodulation of radio frequency signals. The first and second layer CPU may have different characteristics, e.g. different clock rates, cache properties, bit lengths etc.

The architecture 100 of FIG. 1 further comprises three modem components: a GSM modem 150, a 3G modem 160 and an LTE modem 170. Each modem is coupled to interface circuitry 140, which provides access to the two CPUs. Each of the modems may use one or more of the first layer CPU 110 and the second layer CPU 120. The interface circuitry may comprise one or more of a data bus and one or more registers or buffers.

The modem components may be independently enabled and may comprise one or more sub-modules. Typically, one modem component will be active for communications at any one time. However, in certain circumstances two or more modem components may be active at the same time. This may occur when there is a handover between two telecommunication networks. It could also occur for dual-band or dual-mode uses, for example a first connection with a first telecommunications network may be made using a first frequency band and a second connection with a second telecommunications network may be made using a second frequency band. Dual mode usage may occur when multiple subscriber identity modules (SIMs) are installed within a mobile device. In most cases, multiple sub-modules within a modem component will be active at any one time.

In a multi-mode mobile system, such as that of FIG. 1, each modular component or sub-system needs to be controlled. Modern modem designs, for example designs that may implement 3G modem 160 or LTE modem 170, may comprise several million logic gates which need to be controlled. In the example of FIG. 1, control responsibility is divided between software, i.e. program code processed by one or more of the first and second layer CPUs, and hardware, e.g. gate logic, within each of the subsystems. Reducing the amount of control performed by the subsystem hardware reduces overall hardware complexity and offers more flexibility and robustness. However, this approach results in a high loading for one or more of the first and second layer CPUs.

The interconnected modem components of FIG. 1 may experience a number of different interrupt events at a number of different interrupt rates or frequencies. Following an interrupt event an interrupt signal is generated. In conventional systems, these interrupt signals are directed at, and received by, one or more of the multiple processing units. To maintain a real-time communications ability each modem component needs to operate in real time. Hence, there is a problem with architectures, such as that shown in FIG. 1, of how to handle interrupt signals from multiple modem components in real time. This problem is compounded by developments in the art: the number of different sub-systems, components and selectable interrupt signals are continuously increasing. There is also an associated problem of how to maintain real time operations on one or more of the first layer CPU 110 and second layer CPU 120, when each processing unit may be receiving a large number of interrupt signals, and thus have to handle a large number of interrupt events. This is especially problematic in situations where multiple modem components are active. Even if one or more of the first layer CPU 110 and second layer CPU 120 maintain real time operations, for example by reserving a particular percentage of CPU cycles for interrupt handling so as to guarantee operational capabilities, this may be at the cost of a high processing load; for example, a large number of active processing cycles may be dedicated to processing interrupt signals and the subsequent handling of interrupt events.

With modern electronic and computing systems, such as the system shown in FIG. 1, managing interrupts is no longer a simple task. It requires a lot of attention when designing a system. Possible solutions to this problem are: to increase the number of processing units; to increase the clock speed and cache memory of existing processing units; to increase the number of processing cores; or to redesign subsystem hardware. However, these solutions have disadvantages. Increasing the number of processing units or cores increases the physical complexity of the system. Increasing the speed of processing units leads to greater scheduling challenges and higher control software complexity. For example, it results in difficulties co-ordinating the timing requirements for interrupt processing between the CPU circuitry and the subsystem hardware, which in turn makes implementing the control software of the CPUs more difficult. These solutions additionally raise demands for power and circuit area, two resources that are at a premium in mobile devices. Redesigning subsystem hardware may result in fewer interrupt signals being received by the CPUs. However, it comes at the cost of a more complex hardware implementation with limited flexibility. These designs are also difficult to test; it is often not possible to derive predictable, closed system equations for the operation of the circuitry. For example, any change in the modulation or encoding performed by the subsystem hardware would require a redesign of the local subsystem hardware. As such, none of these options are feasible for robust, flexible and efficient system design.

Therefore a problem still remains: how can interrupt events be flexibly managed in modern, complex systems. Additionally, for certain implementations, there is the requirement to solve this problem without adding design and resource overheads, and without imposing onerous real-time requirements on control software. Existing solutions offer no assistance in solving the problems described above. U.S. Pat. No. 7,328, 294 B2, U.S. Pat. No. 7,610,425 B2 and U.S. Pat. No. 6,237, 058 B1 all describe systems wherein interrupt events are still handled by existing processing units, they simply modify how interrupt signals are distributed and scheduled between these processing units. If these systems find themselves under high interrupt loading, for example if multiple interrupt events occur in a short period of time, one solution is to add more processing units to the multiprocessor systems to handle this load. However, even if more processing units are added, these systems can experience degraded system performance if the distribution routine happens to overload one particular processor. This can be a problem for real-time systems.

Certain embodiments address one or more of the problems described above by distributing the interrupt handling away from the processing units, for example to peripheral circuitry. This differs from conventional solutions that distribute the interrupt signals between multiple processing units but still require processor-based interrupt handling. For example, in these conventional solutions interrupt handling is still performed by each processing unit; in certain embodiments described herein the interrupt handling is instead performed by a specific hardware design. This dedicated hardware design provides a sophisticated way to achieve a system that manages a high interrupt load from subsystem hardware but that reduces an interrupt loading on one or more processing units. This approach also has the surprising technical effect of significantly improving system-wide interrupt response times.

Figure 2:
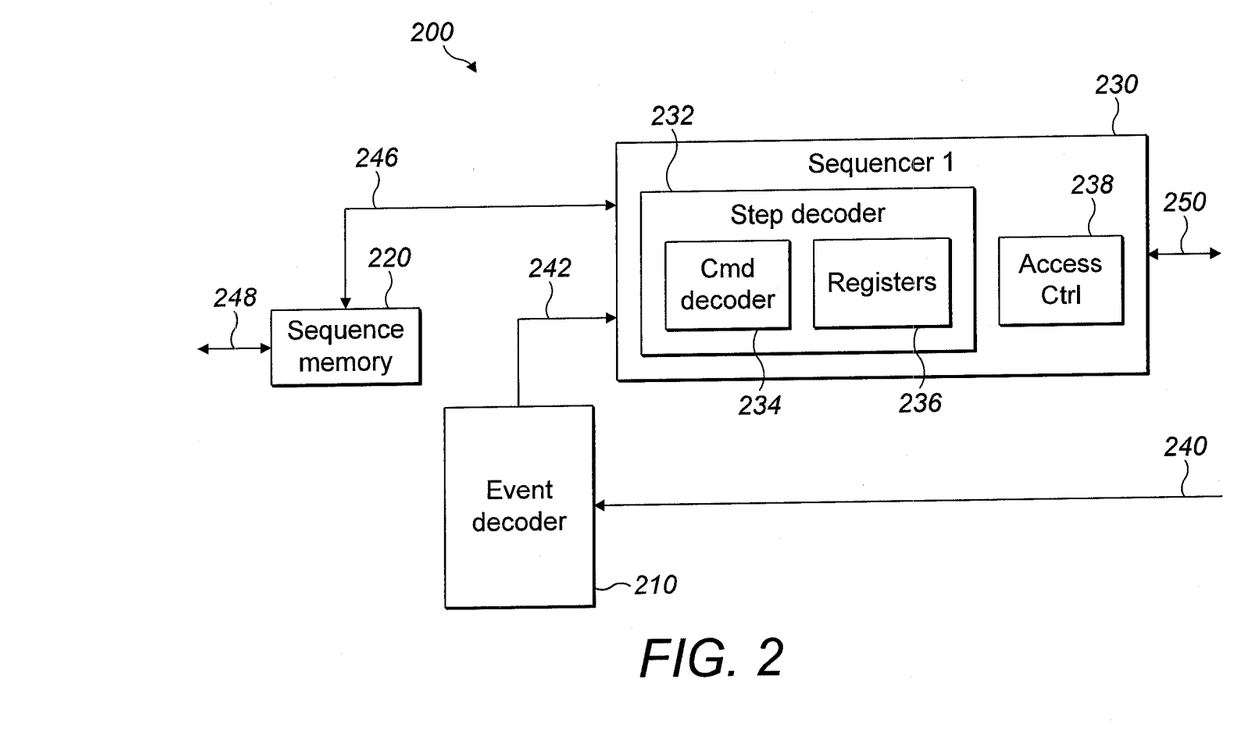
FIG. 2 is a simplified schematic diagram of an apparatus for managing interrupts according to an embodiment.

FIG. 2 shows a first embodiment of an apparatus 200 for managing interrupt events. The apparatus 200 comprises an event decoder 210, a sequence memory 220 and a sequencer 230. The event decoder 210 is coupled to an interrupt signal line 240 for receiving interrupt signals from hardware components, peripheral devices and module circuitry. These interrupt signals are generated by the hardware components, peripheral devices and module circuitry in response to an interrupt event. The event decoder 210 is coupled to the sequencer 230 by sequencer control signal line 242. If no sequences are being actively implemented by the sequencer 230, the event decoder 210 triggers the sequencer 230 to implement an interrupt handling sequence. The event decoder 210 may comprise an event-to-sequence mapping that is programmable. In one implementation an interrupt signal identifies an interrupt event. For example, a binary interrupt signal on a particular interrupt signal line 240 may identify a particular interrupt event and be mapped to an address of a sequence in the sequence memory 220. Alternatively, an interrupt signal may comprise a number of bits received on a common signal line or bus, wherein at least a portion of the bit sequence identifies the address of a sequence in the sequence memory 220. In this case, a particular bit pattern may be mapped to an address in the sequence memory 220. The same sequence can be triggered based on one or more than one interrupt signal if needed.

The sequencer 230 is arranged to access the sequence memory 220 via memory coupling 246. For example, the sequencer 230 may be arranged to retrieve one or more steps of a sequence from the sequence memory 220. The event decoder 210 may retrieve a pointer to an address in the sequence memory 220 responsive to an interrupt event received on interrupt signal line 240, for example using the mapping described above. This pointer may be sent to the sequencer 230 over sequencer control signal line 242. The pointer may be sent responsive to the interrupt event. The sequencer 230 may then read the sequence memory 220 from the address indicated by the pointer. As such the event decoder 210 provides the start address of a sequence. The sequence itself then contains information for further instructions. In certain embodiments sequence memory 220 may comprise non-volatile storage such as flash or NAND memory. The sequences stored in the sequence memory 220 comprise a low-level software procedure. In principle, each step or instruction in a sequence may be thought of as similar to machine code with instructions and operands. In this context, 'low-level' refers to the lowest technical layer of software operation, this being software operation whose execution occurs outside a CPU. The sequence memory 220 is coupled to a control bus 248. The control bus 248, which may be a slave port, is used to load sequences into the sequence memory 220. Sequences may be transferred into the sequence memory 220 under the control of an external processing unit, for example one or more of first layer CPU 110 and second layer CPU 120, or under the control of a direct memory access (DMA) controller. The sequences may be transferred from local or remote storage or from system memory, for example via memory interface 130. In other embodiments, the sequences may be statically stored within the sequence memory 220, for example as may be the case if read-only memory (ROM) is used.

The sequencer 230 comprises a step decoder 232. The step decoder 232 in turn comprises a command decoder 234 and one or more registers 236. The command decoder 234 is arranged to decode and interpret one or more commands in a step of a sequence retrieved from sequence memory 220. The commands may comprise, amongst others, input/output (I/O) operations, variable storage, loop instructions, brand instructions and arithmetic operations. The one or more registers 236 are arranged to store one or more variables used to complete a command. The one or more registers 236 may also store control data received from the event decoder 210 over sequencer control signal line 242. The sequencer 230 also comprises access control circuitry 238 arranged to supervise access to one or more of memory coupling and access bus 250. Access bus 250 may be used for control and/or data exchange with one or more processing units or hardware modules. Neither the apparatus 200 nor the sequencer 230 comprises a conventional processing unit, such as a CPU. For example, a dedicated processor or CPU for interrupt handling would require significant circuit area and have significant power requirements. These are avoided using the above-described apparatus 200. A dedicated processor or CPU would further increase the software and hardware complexity of a system. Additionally, using the present apparatus 200, sequences need not be complied; in certain embodiments they are written as atomic instructions or steps to be interpreted directly by the sequencer.

There are a number of differences between a sequencer 230 and a processing unit or CPU. Depending on the implementation the differences may comprise at least one of the following features. A processing unit or CPU has a main program that controls operation; there is no main program for the sequencer 230—a sequence is loaded from sequence memory if and when an interrupt signal is received. A sequencer 230 may implement several different interrupt-event-triggered sequences; a processing unit or CPU may have a generic interrupt handling routine. A typical Reduced Instruction Set Computing (RISC) CPU has a multiple, e.g. four, stage pipeline and a main CPU may have many more stages; the operation of the present apparatus is equivalent to having a single stage pipeline. A processing unit or CPU has a 'context', i.e. it needs to maintain a program counter storing the memory address of the program code that is being executed when processing is interrupted by an interrupt event; the present apparatus does not maintain a program counter: when a sequence is executed the base address is provided by the event decoder 210.

The apparatus 200 of FIG. 2 stores a low-level software procedure or sequence inside a sequencer memory 220. A sequencer 230 is able interpret simple commands that form steps of a stored sequence. This enables a full interrupt service routine using dedicated hardware without CPU involvement. It also enables an interrupt event to be handled, in response to an interrupt signal, with zero processing overhead from the point of view of a computing module and the system as a whole. Programmability is achieved by configuring the sequences stored in sequence memory 220 and/or the sequence triggering events as detected by the event decoder 210 based on received interrupt signals. Scalability may be achieved by extending the apparatus to use more than one sequencer 230.

The design specifications for a particular implementation of apparatus 200 may be determined based on one or more parameters of an architecture such as architecture 100. For example, the required processing capability of the apparatus for a particular architecture or subsystem may be derived from one or more of the following parameters: an interrupt frequency for one or more interrupt sources, in certain cases this may be a plurality of interrupt frequencies for a group of interrupt sources in an architecture or subsystem; a latency requirement for one or more interrupt sources, e.g. a recommended or maximum time in which an interrupt source expects an interrupt event to be handled; a number of operations that form part of a conventional interrupt handling routing for one or more interrupts; and a number of interrupt events that are expected to occur in parallel in the architecture or subsystem. These parameters may determine one or more of the clock speed of each sequencer and the number of sequencers that are to be implemented in parallel. Flexibility is provided by enabling sequence steps and sequence triggers, for example the mapping performed by the event decoder, to be configurable. An apparatus configuration may also be modified dynamically, i.e. during operation, by dynamically loading modified sequence steps into the sequence memory or by dynamically configuring a mapping memory of the event decoder. This may be performed based on a particular system condition.

Figure 3:
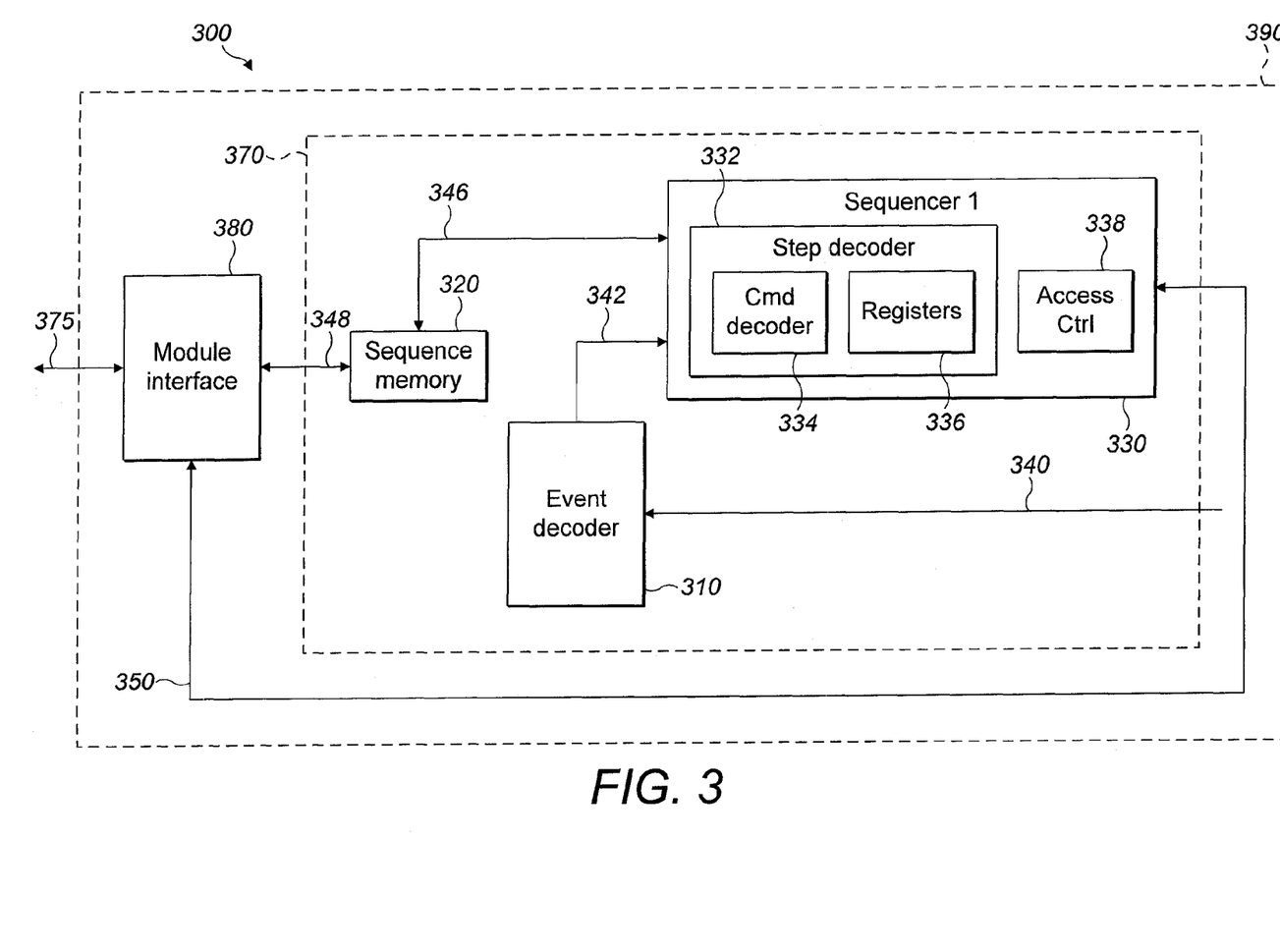
FIG. 3 is a simplified schematic diagram of a first implementation of the apparatus for managing interrupts.

FIG. 3 shows a first exemplary implementation 300 of the apparatus for managing interrupts that is shown in FIG. 2. In the example of FIG. 3, the apparatus is implemented as part of a Fast Frequency Transform (FFT) module 370. The FFT module 370 comprises circuitry (not shown) for implementing an FFT algorithm and may comprise part of, for example, any of modem components 150, 160, 170. This circuitry experiences one or more interrupt events. These interrupt events lead to the generation of respective interrupt signals. These interrupt signals are received on interrupt signal line 340 by an event decoder 310. Similar to FIG. 2, the apparatus further comprises a sequence memory 320 coupled to a sequencer 330 via memory coupling 346. The event decoder 310 is coupled to sequencer 330 via sequencer control signal line 342. The sequencer 330 comprises a step decoder 332, with a command decoder 334 and registers 336, and access control circuitry 338. The access control circuitry controls communication over an FFT access bus 350 that couples sequencer 330 to a module interface 380. The module interface 380 couples the FFT module 370, including the sequencer 330, to other hardware subsystems; for example, one or more of the first layer CPU 110 and the second layer CPU 120 via interface circuitry 140. In such a case, module interface 380 may be coupled to interface circuitry 140 via a slave port 375. The sequence memory 320 is coupled to the module interface 380 via sequence memory interface 348. Data to be stored in, and/or read from, an address in sequence memory 320 may be handled by the module interface 380 using the sequence memory interface 348.

In the first exemplary implementation 300 interrupt signals received on interrupt signal line 340 control the operation of the apparatus. In FIG. 3, the apparatus is shown as a sub-block within the FFT module 370; however, the apparatus can alternatively be located on a higher layer, e.g. a higher level in a register-transfer level (RTL) hierarchy, an address decoding hierarchy and/or a power domain hierarchy. The example of FIG. 3 comprises an apparatus with one sequencer dedicated to handle a single set of interrupt events, i.e. a single set of interrupt events that lead to a number of interrupt signals on a single interrupt signal line 340. This implementation may be preferred in circumstances where clarity and simplicity are required; however, in many implementations one sequencer will handle a plurality of interrupt events from a plurality of interrupt sources.

Figure 4:
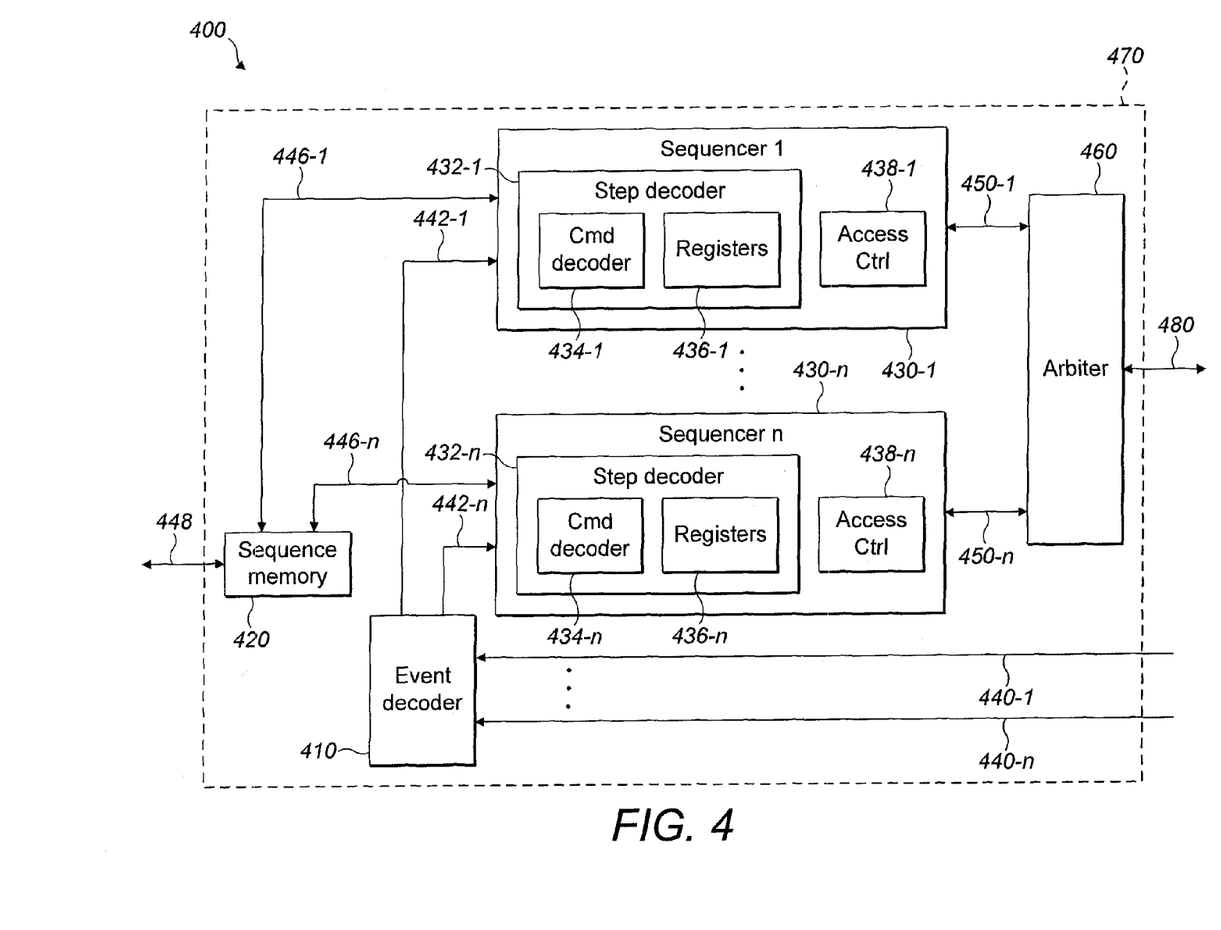
FIG. 4 is a simplified schematic diagram of a second implementation of the apparatus for managing interrupts.

FIG. 4 shows a second exemplary implementation 400 of the apparatus of FIG. 2. In this case the apparatus 470 is arranged to handle a plurality of interrupt events using a plurality of sequencers. In the example of FIG. 4, an event decoder 410 is arranged to receive a plurality of interrupt signals over a plurality of interrupt signal lines 440-1 to 440-n. This collection of n interrupt signal lines may, in some implementations, comprise a single interrupt signal bus that is shared by one of more interrupt sources, i.e. an one-to-many electrical coupling. In this example, n sequencers 430-1 to 430-n are provided to handle n interrupt events. It is not necessary for the number of sequencers to match the number of different interrupt signals received by the event decoder. In certain implementations there may be m sequencers that handle n interrupt events, wherein m is greater than, equal to or smaller than n. In an implementation with a one-to-one mapping between sequencers and interrupt signals the ith sequencer may be response to signals on the ith interrupt signal line, with the mapping being implemented by the event decoder 410. However, any mapping of interrupt signals or events to sequencers is possible; indeed, in certain cases the event decoder 410 is configurable so as to implement a bespoke and/or dynamic mapping between received interrupt signals and sequencers. In FIG. 4 the event decoder 410 is coupled to each of the sequencers 430 via respective sequencer control signal lines 442-1 to 442-n. In certain cases this may be implemented by coupling each sequencer 430 to a common bus that is also coupled to event decoder 410. Likewise a sequence memory 420 is coupled to each of the sequencers 430 by respective memory couplings 446-1 to 446-n, which may be implemented as a common memory bus. In a similar manner to sequence memory 220 in FIG. 2, one or more sequences may be loaded into sequence memory 420 via control bus 448. Each sequencer 430 loads one or more steps from the sequence memory 420 via the memory couplings 446. This may be performed based on a sequence memory address received from the event decoder 410. Two or more sequencers 430 may load the same sequence steps from sequence memory 420. For example, this may be the case when a common operation is to be performed in parallel on a plurality of data items. Each sequencer 430 comprises a step decoder 432, with a respective command decoder 434 and one or more registers 436, and access control circuitry 438. The access control circuitry 438 controls access to a master bus. In FIG. 4 each sequencer 430 is coupled to an arbiter 460 via a respective master bus coupling 450-1 to 450-n. The arbiter 460 then controls access to a common master bus 480. In other implementations, each sequencer 430 may be coupled to a common master bus directly.

Figure 5:
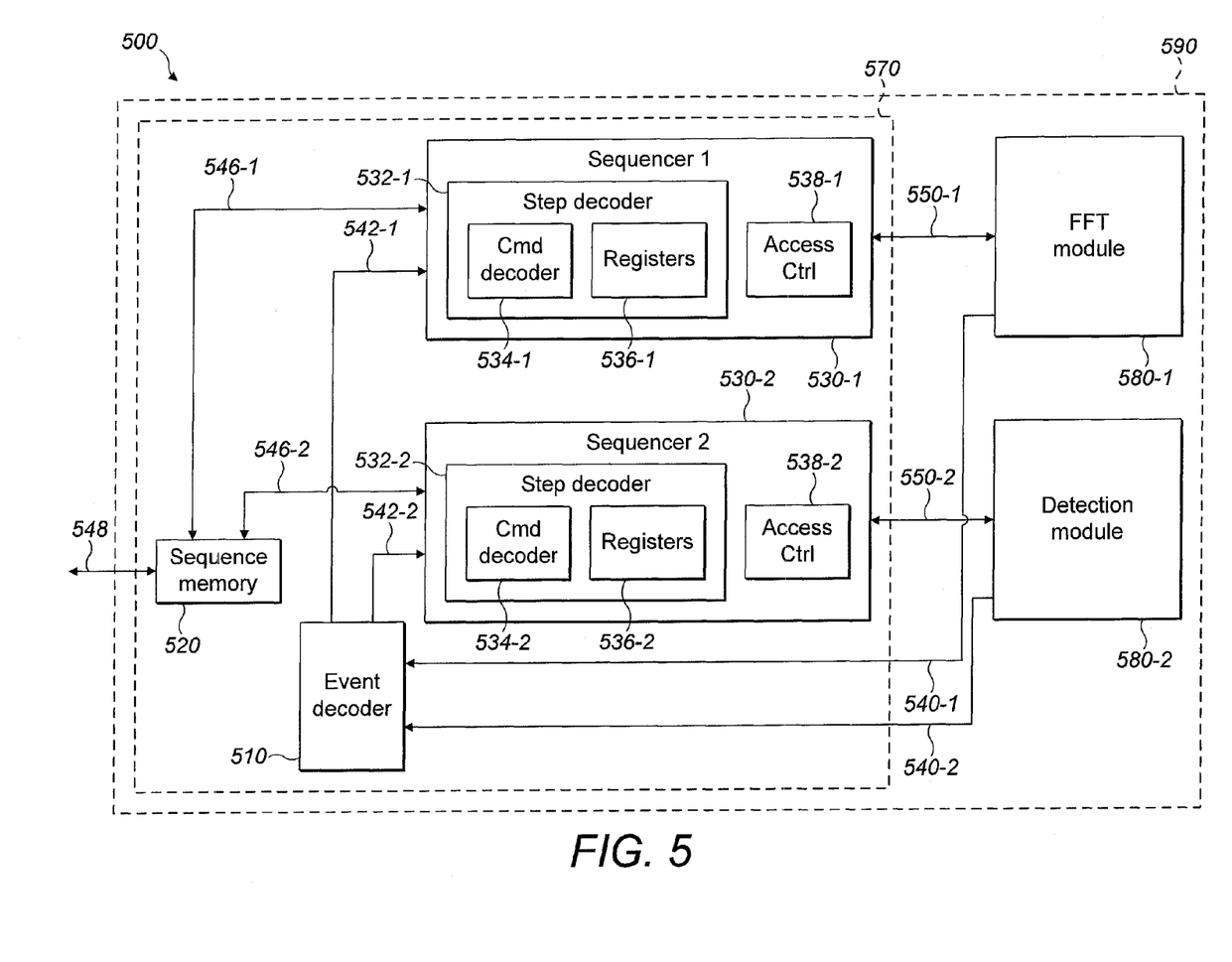
FIG. 5 is a simplified schematic diagram of a third implementation of the apparatus for managing interrupts.

FIG. 5 shows a third implementation 500 of the apparatus for managing interrupts. In this example, the apparatus is shared by a number of components within a power domain 590. These components may form part of LTE modem 170. In this context, a power domain comprises a number of hardware components that are collectively powered based on a particular power state; for example, all components in a selected power domain may be powered when a device is in an active mode but powered down when a device is in a standby mode. In the example of FIG. 5, the power domain comprises an FFT module 580-1 and a detection module 580-2. The exact nature, i.e. function, and number of the modules may vary in implementations. The FFT module 580-1 is coupled to an event decoder 510 via a first event signal line 540-1; therefore, interrupt signals from the FFT module 580-1 are sent to the event decoder 510 along this line. These interrupt signals relate to interrupt events at FFT module 580-1. The detection module 580-2 is coupled to the event decoder 510 via a second interrupt signal line 540-2; therefore, interrupt signals from the detection module 580-2 are sent to the event decoder 510 along this line. These interrupt signals relate to interrupt events at detection module 580-2. The event decoder 510 processes each of the interrupt signals on the two interrupt signal lines 540 and sends a respective control signal to sequencers 530. For example, the event decoder 510 may receive an interrupt signal over the first event signal line 540-1 and as such send control data to a first sequencer 530-1 over a first sequencer control signal line 542-1. As in the other implementations, this control data may comprise a start address for a sequence in sequence memory 520 and/or a data signal, such as a flag or bit sequence, in response to a received interrupt signal. Likewise, the event decoder 510 may receive an interrupt signal over the second event signal line 540-2 and as such send control data to a second sequencer 530-2 over a second sequencer control signal line 542-2. Each sequencer 530 loads one or more steps from the sequence memory 520 via the memory couplings 546. This may occur independently, i.e. the first sequencer 530-1 may retrieve one or more steps over a first memory coupling 546-1 independently of the second sequencer 530-2, which may retrieve one or more steps over a second memory coupling 546-2. The two sequencers 530 may load the same sequence steps from sequence memory 520; however, in the present example, it is likely that the sequences for handling an interrupt event for each module 580 will be different.

Each sequencer 530 comprises a step decoder 532, with a respective command decoder 534 and one or more registers 536, and access control circuitry 538. The access control circuitry 538 controls access to a each of the modules 580; for example, first access control circuitry 538-1 in the first sequencer 530-1 controls access to the FFT module 580-1 over a first access bus 550-1 and second access control circuitry 538-2 in the second sequencer 530-2 controls access to the detection module 580-2 over a second access bus 550-2. The first and second access buses need not be dedicated buses; in certain embodiments they may comprise couplings that are arbitrated to power domain main interconnect, e.g. in a similar manner to the arbitration performed by arbiter 460 in FIG. 4.

The operation of the embodiment of FIG. 2 and each of the exemplary implementations of FIGS. 3 to 5 will now be explained with reference to an exemplary method for managing interrupt events.

Figure 6:
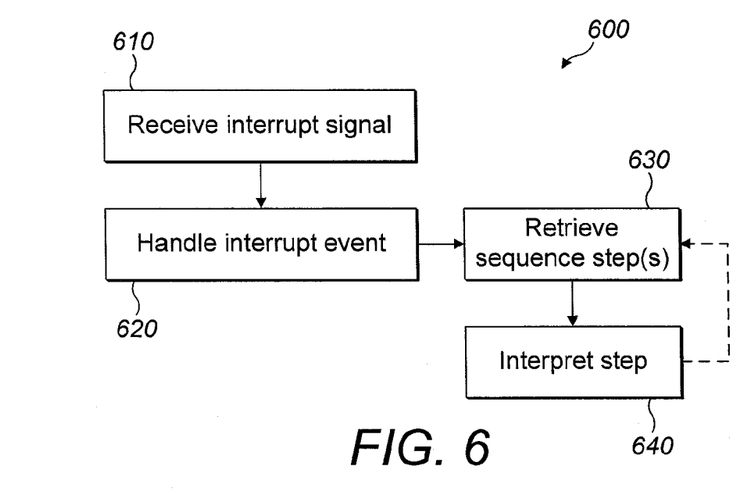
FIG. 6 is a flow diagram showing exemplary steps in a first method for managing interrupt events.

FIG. 6 shows a first set of exemplary steps 600 for managing an interrupt event. Before these steps 600 commence it is assumed that a component of a computing device, peripheral device or module circuitry experiences an interrupt event. This leads to the generation of an interrupt signal. At step 610, the interrupt signal is received. For example, in one or more of apparatus 200, 300, 400, 500, the interrupt signal may be received at an event decoder 210, 310, 410, 510 via an interrupt signal line 240, 340, 440, 540. Following receipt of an interrupt signal, an interrupt event is handled at step 620. For example, one or more of apparatus 200, 300, 400, 500 handles the interrupt event associated with the received interrupt signal. As the apparatus handles interrupt events directly, without necessarily involving one or more processing units, such as the first and second layer CPUs 110,120, the interrupt event can be handled in real-time.

An interrupt event is handled by having a sequencer perform a number of sequence steps. The sequencer is a dedicated processing device arranged to implement interrupt handling sequences. At step 630, one or more sequence steps are retrieved from a sequence memory. In certain embodiments, the sequence memory is a dedicated memory for storing interrupt handling sequences to be interpreted by one or more sequencers. One or more sequences may be stored in a sequence memory by a CPU during a setup, configuration or boot stage or one or more sequences may be stored dynamically in the sequence memory, e.g. in parallel with the operations of hardware subsystems. A sequencer may retrieve one step per operation cycle or may retrieve multiple steps to interpret over multiple subsequent operation cycles. At step 640, the sequencer interprets a retrieved step in a sequence. The interpretation of a step may involve performing one or more operations to handle the interrupt event. Example operations are described in more detail below. After a step has been interpreted and implemented, one or more further steps in the sequence may be retrieved and/or interpreted; i.e. in certain implementations, steps 630 and 640 may be repeated to implement a sequence with two or more steps.

By performing this method there is no interrupt handling overhead as is found with a standard CPU. For example, no context switching is required and a sequence to handle the interrupt event can be implemented immediately following receipt of the interrupt signal. Thus components of a computing device, peripheral devices and other modules experience an interrupt handling response as if they were provided with a separate CPU. A sequence can be handled immediately as the sequence can be rapidly retrieved from local sequence memory without the need to reconfigure or save existing processing. The sequence, as interpreted and implemented by a sequencer, is able to set a module configuration for an interrupt source following the receipt of an interrupt signal. The method distributes an interrupt load and interrupt handling away from one or more CPU(s), e.g. to one or more module subcomponents and/or one or more power and voltage domains. It enables fast response times to an interrupt signals and real time requirements can be easily guaranteed for all system conditions. Real time requirements can be guaranteed as a hardware designer need only concern themselves with the operation of the apparatus performing the method; they do not need to know the complex interdependencies that govern the operation of a standard processing unit. As dedicated sequences are implemented at a particular clock rate by the dedicated sequencers, cycle timings, for example the number of sequencer cycles needed to perform interrupt handling can be easily calculated based on known variables. As most interrupt events can be handled by the apparatus implementing the method, without generating additional interrupt signals for a processing unit, the load on the processing unit is significantly reduced. Furthermore, when using implementations such as those shown in FIG. 4 or FIG. 5, multiple interrupt events can be handled in parallel using a plurality of sequencers. This differs from the conventional serial loading of a standard CPU. In certain cases, use of the embodiments described herein, reduces load on a CPU to such an extent that existing CPUs can be removed or downgraded. This results in significant circuit area and cost savings. Additionally, there is the surprising effect of reducing data bus traffic, for example on a main interconnect such as interface circuitry 140, as data is handled locally to computing modules and interrupt signals do not need to be transferred to one or more processing units.

Figure 7:
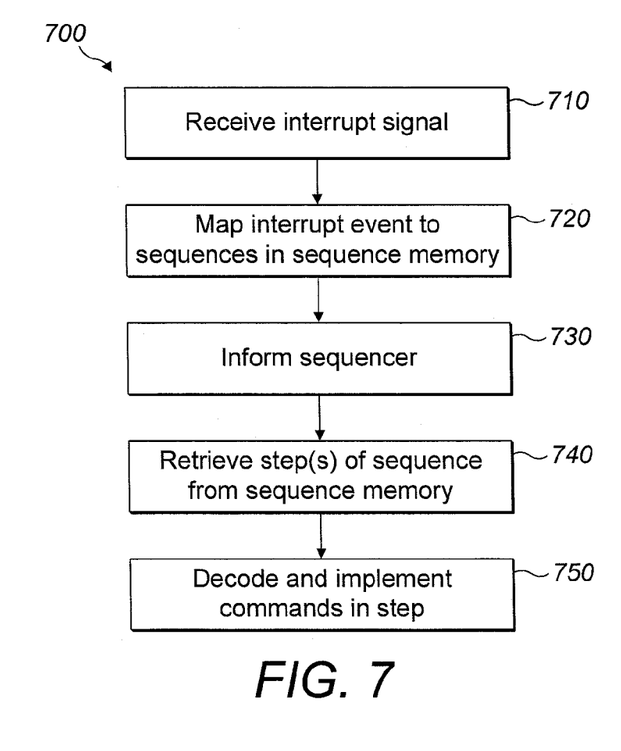
FIG. 7 is a flow diagram showing exemplary steps in a second method for managing interrupt events.

FIG. 7 shows exemplary steps in a second method for managing interrupt events. In particular, the second method has a number of steps that demonstrate the triggering of a sequence by an interrupt event. For ease of explanation further reference will be made to the apparatus of FIG. 2, although the method may be applied to any embodiment.

At step 710, at interrupt signal is received, for example at an event decoder 210 in response to an interrupt event at an interrupt source (not shown). At step 720, the interrupt event is mapped to one or more sequences in a sequence memory 220. For example, an event decoder 210 may have a small programmable memory that stores a mapping between interrupt signals and addresses in sequence memory 220. The address may be a memory address of a first step in a sequence associated with the interrupt signal. The mapping may comprise a look-up table or the like. At step 730, a sequencer 230 is informed of the memory address. In one implementation, the event decoder 210 may also store a mapping between a received interrupt signal 240 and a sequencer 230. For example, a particular sequencer 230 may be hard-configured to implement sequences to handle interrupt events relating to interrupt signals on a particular interrupt signal line 240. In this case, there may be a dedicate look-up table for an interrupt signal received over a particular interrupt signal line 240 and the event decoder 210 may be configured to send the memory address, which may be considered control data, to the sequencer 230 associated with said interrupt signal line 240 over a respective sequencer control line 242; e.g. in one implementation of the apparatus of FIG. 5, an interrupt signal from FFT module 580-1 is received on interrupt signal line 540-1 and results in an address being sent to sequencer 542-1. In another implementation, the event decoder 210 may send a signal to the sequence memory 220 over an event mapping signal line (not shown). This signal may comprise a memory address or a variable that enables the memory address to be retrieved, e.g. using a mapping at the sequence memory 220. The event decoder 210 may then send a 'ready' signal or the like to a sequencer 230 over the sequencer control line 242. The sequencer 230 may then access the sequence memory 246. In this case the sequence memory 220 is prepared to retrieve the appropriate first sequence step from memory based on the signal from the event decoder 210 and the access request from the sequencer 230. In any case, at step 740 the selected sequencer 230 retrieves a step of a mapped sequence from sequence memory 220. Following this, the sequencer 230 decodes one or more commands in the step, for example using step decoder 232 and/or command decoder 234, and implements or interprets the step using, if necessary, one or more registers 236 and access control circuitry 438. If the sequence comprises two or more steps, following the implementation of the first step in the sequence, the sequencer 230 may be arranged to retrieve a second step in the sequence from the sequence memory 220, for example as should by the loop of steps 630 and 640 in FIG. 6.

Each step comprises one or more simple instructions or operations. For example, a step may comprise, amongst others, commands for one of: I/O access; variable storage; loop operations; branch operations; or computing arithmetic. For example, I/O access commands may comprise, amongst others, one of: writing, to anywhere in the address space, an instruction address and/or data as a parameter; reading, from anywhere in the address space, an instruction address and/or a result mapping as a parameter; and generating an interrupt signal to be sent to a CPU. Variable storage may comprise storing one or more variables in one or more of registers 236, i.e. the internal registers of one or more sequencers. A command for a loop operation may comprise a command to loop N times. Computing arithmetic may comprise one or more of increment, decrement and comparison for variables. A command for a branch operation may comprise at least a portion of an IF-ELSE programming structure. An instruction set comprising a limited number of operations may be simply implemented and allow for straightforward programming and debugging. The limited instructions set out above are surprisingly powerful; they can implement many interrupt handling routines. Due to loop and branch support in sequences, the repetition of configurations is not needed (although may still be supported). For example, repeated instructions that use different parameters can be presented in a loop structure and correct parameters for each step can be based on a loop index. A loop structure can be configured to be executed based on an initial interrupt event or to wait for interrupt events between loop steps.

An example implementation of a sequence will now be described. This example sequence may be used to handling interrupt events that arise from evolved Universal Mobile Telecommunications System (UMTS) Terrestrial Radio Access Network (eUTRAN) front end (EFE) and FFT processing. Before the sequence is implemented an initial configuration of EFE and FFT hardware modules is performed by a CPU. The initial configuration of the modules may comprise loading data so that modules can start data processing. The sequence may then be implemented by one or more sequencers within the described apparatus without CPU involvement. The steps of the sequence are as follows:

Loop for N times (where N is number of symbols in a sub-frame);
  Wait for an EFE interrupt signal;
    Update an EFE module configuration so as to generate new interrupt after the next orthogonal frequency-division multiplexing (OFDM) symbol is received;
    Configure an FFT module;
      Start an FFT calculation for a first radio frequency carrier signal;
      Wait for an FFT interrupt signal;
      Start an FFT calculation for a second radio frequency carrier signal;
      Wait for an FFT interrupt signal;
  Increment a loop counter;
    Check for a loop limit (i.e. N);
End loop and generate an interrupt signal for the CPU to indicate a sub-frame boundary.

In some implementations, the sequence may also comprise a 'Generate interrupt for the CPU to indicate that one OFDM symbol is ready' step after the second 'Wait for an FFT interrupt signal' step.

As can be seen by the example above, there are many operations within a computing system that are relatively simple but that require interrupt handling for a large number of interrupt events. For example, each loop in the sequence above involves the management of three interrupt signals and the steps must be performed at least in real time. This would be typically too much for a typical L1 CPU to handle.

Another exemplary sequence comprises steps for configuring a decoding module. In a conventional implementation, a CPU such as first layer CPU 110, maintains information relating to hybrid automatic repeat request (HARQ) memory allocations and writes the information to an ASIP such as second layer CPU 120, which configures the decoding module based on an interrupt event from the decoding module. This conventional implementation may be replaced with a sequence implemented according to the present embodiments that reads variable values, writes variable values to hardware such as the decoding module and increments a counter to move a pointer to indicate processing of a subsequent hardware configuration.

Compared to conventional solutions, certain implementations of the apparatus and method described have the following advantages.

Firstly, a significant CPU interrupt load reduction may be achieved. This can free CPU capacity for processing program code relating to device applications instead of interrupt handling and I/O accesses. Compared to the use of a dedicated CPU using the apparatus has a significant power consumption reduction; a CPU typically requires a large circuit area and a high frequency clock, whereas the described embodiments are compact and only require a moderate frequency clock to handle interrupt events. The resulting reduction in data bus accesses from a CPU to peripheral devices achieved with the described embodiments also reduces power consumption. As embodiments reduce the load on existing CPUs, existing CPU's can be reduced in size while maintaining previous levels of computational capacity. In certain implementations, it may be able to remove one or more CPUs or processing cores completely. These advantages apply regardless of whether a CPU or ASIP is used. For example, in an exemplary implementation, the apparatus may require approximately five thousand gates of logic and a low number (e.g. 1-5) of kilobits of sequence memory. For comparison, a typical ASIP core requires about one hundred thousand gates of logic and more than 10 kilobytes of memory.

Secondly, embodiments as described herein provide a greater flexibility for future changes in hardware design, e.g. as the complexity of hardware subsystems increases. By using the embodiments an electronic computing system can accommodate a large increase in interrupt loading and more onerous real time requirements for interrupt handling can be guaranteed. For example, using the approach of the embodiments, additional accelerator hardware within computing modules can be provided as modular components that interface into the described apparatus, as opposed to having complex processing chains or finite state machines as required with conventional implementations. For example, the fast and predictable response times provided by the dedicate apparatus of the embodiments removes the need for hardware components to monitor a waiting state for interrupt processing; these waiting states may be required when CPU response and interrupt handling times cannot be guaranteed. This is especially important where computing-cycle accurate functionality is required. The lack of complex processing chains, or finite state machines with high dimensionality, makes it easier to verify hardware designs and provides more robust interrupt handling.

In this regard, the described embodiments provide an improved alternate solution to, for example, the use of shadow registers. Shadow registers mitigate some of the inconvenience of context switching at a CPU when handling interrupt events by having a duplicate set of registers for storing configuration information that can then be copied into a CPU's main set of registers as part of an interrupt handling routine at a CPU. However, the use of shadow registers requires the monitoring of a chain of events within the circuitry of a system that is typically not direct accessible or visible to control software being processed by a CPU. This means there is no way for control software to alter a train of events involving the shadow registers; for example, it is not possible for control software to postpone the update of configuration data in CPU registers or the start of CPU processing once a chain of actions produced following an interrupt is set in motion. Furthermore, in practice, the use of shadow registers is error prone. For example, all possible chain-of-action scenarios need to be taken into account in design phase and it is difficult to provide control software workarounds for bugs in the interrupt handling procedures. In contrast, the described embodiments handle an interrupt event without necessary use of a CPU and CPU control software. Hence, the above problems are avoided. The use of interrupt handling sequences configured for implementation by one or more dedicated sequencers avoids mixing different layers of control which may not be visible or accessible to each other.

Thirdly, embodiments as described herein are particularly suited for implementation in low-cost ASICs. In these cases, the required functionality of a circuit may be fully known beforehand, i.e. at the design stage. This facilitates the implementation of interrupt handling sequences for the described apparatus. For example, in a conventional system, data may be available for control software to access for a limited number of CPU clock cycles. In this case, the control software comprises program code processed by said CPU. With conventional CPU-based interrupt handling it is often impossible to respond to access said data within the timing window comprising said limited number CPU clock cycles. However, the present embodiments are able to react within this timing window. For example, an apparatus as described above implemented within the same power domain as a module that generates an interrupt event would avoid synchronization delays caused by crossing one or more power domains, as would occur with conventional CPU-based interrupt handling.

The apparatus and method as described above is flexible, scalable and programmable. It may be implemented with little effect on an existing system and its modular components. Each implementation may be different and will typically depend on the design of the system the apparatus is to be incorporated into, including factors such as the type and number of processing units and hardware acceleration. The above embodiments are thus to be understood as illustrative examples of the invention. Variations to the examples described above should thus be expected. Multiple combinations, omissions and additions to the described components and method steps are also envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

For example, the event decoder may be arranged to implement a mapping between a received interrupt signal and a sequence stored in the sequence memory, the control data indicating a start address of said sequence. The mapping may be configurable and the sequencer may be arranged to retrieve a sequence from the sequence memory based on said mapping before interpreting said sequence.

In certain embodiments, a sequencer comprises a step decoder itself comprising a command decoder for decoding one or more commands in a step from a sequence and one or more registers for storing one or more respective variables. In this case, the one or more sequencers may be arranged to interpret a step comprising at least a variable storage operation involving said one or more registers.

In some cases, a sequencer comprises an access controller for controlling access to at least one of the sequence memory and a data bus.

In some cases, the one or more sequencers are arranged to interpret a step comprising at least one of the following operations: a loop command for a sequence, a branch command for a sequence and an arithmetic computation.

In certain embodiments, the apparatus forms part of a system with one or more processing units, the event decoder being arranged to receive said one or more interrupt signals from said one or more interrupt sources on behalf of one or more processing units. In this case, the one or more sequencers may be arranged to interpret a step comprising at least an input/output (I/O) operation involving one of a memory or said one or more processing units. Additionally, the one or more sequencers may be arranged to interpret a step comprising at least an operation for generating a further interrupt signal, said further interrupt signal to be sent to one of said one or more processing units. In these cases, the one or more sequences may be loaded into the sequence memory by a central processing unit or a direct memory access controller, wherein the central processing unit comprises one of said one or more processing units. To implement this, the sequence memory may have an interface for coupling the sequence memory to a control bus.

In some cases, the sequencer comprises an interface for coupling the sequencer to a respective master port. An arbiter may be used for coupling a plurality of sequencers to one or more master ports.

In certain embodiments, a plurality of sequencers arranged to interpret a respective plurality of sequences in parallel. For example, at least a first sequencer may be coupled to a first computing module and at least a second sequencer may be coupled to a second computing module, the event decoder being arranged to receive interrupt signals from both of said first and second computing modules.

A computing module may comprise a telecommunication module, for example a modem. A computing system may also comprise a peripheral device or a component module coupled to the event decoder of said apparatus, the peripheral device or component module being arranged to send an interrupt signal to said event decoder.

In some cases, an exemplary method for managing interrupt events comprises decoding the received interrupt signal to produce control data accessible by the sequencer, the control data comprising a start address for the sequence. This may involve mapping the received interrupt signal to one or more steps of a sequence stored in a sequence memory, wherein said one or more steps are interpreted using the sequencer. The mapping may be configurable and the step of retrieving one or more steps of a sequence may be performed based on said mapping before interpreting said sequence.

In certain embodiments, handling said interrupt signal comprises decoding, by the sequencer, one or more commands in a step from a sequence. Interpreting said one or more steps of the sequence on a sequencer may comprise storing one or more variables in one or more respective registers of the sequencer. Handling said interrupt signal received by the event decoder may comprise controlling access to at least one of the sequence memory and a data bus. It can also comprise interpreting a first set of one or more steps of the sequence on a first sequencer and interpreting a second set of one or more steps of the sequence on a second sequencer.

One or more steps of the sequence on a sequencer can comprise any of interpreting a loop command, interpreting a branch command and performing an arithmetic computation.

In some cases, receiving an interrupt signal comprises receiving an interrupt signal from said one or more interrupt sources on behalf of one or more processing units. In this case, interpreting said one or more steps of the sequence on a sequencer may comprise performing an input/output (I/O) operation involving one of a memory or said one or more processing units and/or generating a further interrupt signal and sending said further interrupt signal to said one or more processing units.

In certain embodiments, the method comprises loading one or more sequences into the sequence memory. This step may be performed by a central processing unit or a direct memory access controller and said central processing unit may comprise one of said one or more processing units.

Handling an interrupt signal received by the event decoder may comprise interpreting a first set of one or more steps of the sequence on a first sequencer and interpreting a second set of one or more steps of the sequence on a second sequencer.

Receiving an interrupt signal from an interrupt source may comprise receiving a first interrupt signal from a first interrupt source, receiving a second interrupt signal from a second interrupt source, interpreting a first set of one or more steps of the sequence on a first sequencer to handle a first interrupt event relating to the first interrupt signal and interpreting a second set of one or more steps of the sequence on a second sequencer to handle a second interrupt event relating to the second interrupt signal. The receiving and/or interpreting steps may be performed in parallel. The first interrupt source may comprise a first computing module and the second interrupt source may comprise a second computing module. These computing modules may comprise a telecommunication module, for example a modem.

In accordance with an embodiment, there is provided a computer program product comprising a non-transitory computer-readable storage medium having computer readable instructions stored thereon, the computer readable instructions being executable by a computerized device to cause the computerized device to perform a method for managing interrupt events, the method comprising receiving an interrupt signal from an interrupt source at an event decoder and handling an interrupt event relating to the interrupt signal received by the event decoder by retrieving one or more steps of a sequence from a sequence memory and interpreting said one or more steps of the sequence on a sequencer.

In accordance with an embodiment, there is provided a computing system comprising a first computing module, a second computing module and an apparatus comprising an event decoder for receiving one or more interrupt signals from one or more interrupt sources and for decoding a received interrupt signal to produce control data relating to an interrupt event, a sequence memory for storing one or more sequences, a sequence comprising one or more steps for handling one or more interrupt events, and one or more sequencers for interpreting one or more steps of a sequence stored in the sequence memory, the one or more sequencers being arranged to receive said control data from the event decoder. The apparatus is coupled to a data bus of the computing system.

The apparatus and method may be used in any computing system, for example any digital integrated circuit, but are particularly suited to: wireless chipsets, including application processor systems and modem ASICs/SoCs; low power electronic hardware; multimode digital systems; multi-processor and/or multi-clock ASIC/SoC systems; and other CPU-based systems. The apparatus and method may be implemented, for example, in the systems of a telecommunications device, wherein a telecommunications device may include but is not limited to the following: (a) wired and wireless telephones, (b) satellite telephones, (c) personal communication devices, (d) electronic devices configured to share content in a local area network (LAN), (e) electronic gaming devices, (f) electronic music devices including, but not limited to, MP3 players and the like, (g) telecommunications network infrastructure equipment, including but not limited to a base station, (h) dual-mode cellular terminals which utilize a cellular network and a non-cellular network, (i) other types of mobile devices or terminals, (j) any machines configured for wireless communications in various applications, including but not limited to, smart homes, smart metering, fleet management, remote healthcare, or access network operation management, or (k) any device used in a device-to-device connection.

It will be understood that the apparatus referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least the components of the apparatus described above, which are configurable so as to operate in accordance with the exemplary embodiments.

What is claimed is:

1. An interrupt management apparatus comprising:
    an event decoder for receiving one or more interrupt signals from one or more interrupt sources and decoding a received interrupt signal to produce control data relating to an interrupt event;
    a sequence memory for storing one or more sequences, a sequence comprising one or more steps for handling one or more interrupt events; and
    one or more sequencers for receiving said control data from the event decoder, retrieving one or more steps of a sequence from the sequence memory based on the received control data, and interpreting the retrieved one or more steps.

2. The apparatus of claim 1, wherein the event decoder is arranged to implement a mapping between a received interrupt signal and a sequence stored in the sequence memory, the control data indicating a start address of said sequence.

3. The apparatus of claim 2, wherein the mapping is configurable.

4. The apparatus of claim 2, wherein a sequencer is arranged to retrieve a sequence from the sequence memory based on said mapping before interpreting said sequence.

5. The apparatus of claim 1, wherein a sequencer comprises:
    a step decoder comprising:
        a command decoder for decoding one or more commands in a step from a sequence; and
        one or more registers for storing one or more respective variables.

6. The apparatus of claim 5, wherein the one or more sequencers are arranged to interpret a step comprising at least a variable storage operation involving said one or more registers.

7. The apparatus of claim 1, wherein a sequencer comprises: an access controller for controlling access to at least one of the sequence memory and a data bus.

8. The apparatus of claim 1, wherein the one or more sequencers are arranged to interpret a step comprising at least one of the following operations:
    a loop command for a sequence;
    a branch command for a sequence; and
    an arithmetic computation.

9. The apparatus of claim 1, wherein the apparatus forms part of a system with one or more processing units, the event decoder being arranged to receive said one or more interrupt signals from said one or more interrupt sources on behalf of one or more processing units.

10. The apparatus of claim 9, wherein the one or more sequencers are arranged to interpret a step comprising at least an input/output (I/O) operation involving one of a memory or said one or more processing units.

11. The apparatus of claim 9, wherein the one or more sequencers are arranged to interpret a step comprising at least an operation for generating a further interrupt signal, said further interrupt signal to be sent to one of said one or more processing units.

12. The apparatus of claim 9, wherein one or more sequences are loaded into the sequence memory by a central processing unit or a direct memory access controller.

13. The apparatus of claim 11, wherein said central processing unit comprises one of said one or more processing units.

14. The apparatus of claim 12, wherein the sequence memory has an interface for coupling the sequence memory to a control bus.

15. The apparatus of claim 1, wherein a sequencer comprises an interface for coupling the sequencer to a respective master port.

16. The apparatus of claim 1, comprising an arbiter for coupling a plurality of sequencers to one or more master ports.

17. The apparatus of claim 1, comprising:
a plurality of sequencers arranged to interpret a respective plurality of sequences in parallel.

18. The apparatus of claim 17, wherein at least a first sequencer is coupled to a first computing module and at least a second sequencer is coupled to a second computing module, the event decoder being arranged to receive interrupt signals from both of said first and second computing modules.

19. A computing module comprising:
an apparatus comprising:
an event decoder for receiving one or more interrupt signals from one or more interrupt sources and decoding a received interrupt signal to produce control data relating to an interrupt event;
a sequence memory for storing one or more sequences, a sequence comprising one or more steps for handling one or more interrupt events; and
one or more sequencers for receiving said control data from the event decoder, retrieving one or more steps of a sequence from the sequence memory based on the received control data, and interpreting the retrieved one or more steps; and
a module interface coupled to said one or more sequencers and said sequence memory, the module interface being arranged to send and/or receive data over a data bus.

20. The computing module of claim 19, wherein the computing module comprises a telecommunication module or a modem.

21. A computing system comprising:
one or more central processing units; and
an apparatus comprising:
an event decoder for receiving one or more interrupt signals from one or more interrupt sources and decoding a received interrupt signal to produce control data relating to an interrupt event;
a sequence memory for storing one or more sequences, a sequence comprising one or more steps for handling one or more interrupt events; and
one or more sequencers for receiving said control data from the event decoder, retrieving one or more steps of a sequence from the sequence memory based on the received control data, and interpreting the retrieved one or more steps,
the event decoder of said apparatus being arranged to receive one or more interrupt signals from one or more interrupt sources on behalf of said one or more central processing units.

22. The computing system of claim 21, comprising:
a peripheral device or a component module coupled to the event decoder of said apparatus, the peripheral device or component module being arranged to send an interrupt signal to said event decoder.

23. A method for managing interrupt events comprising:
receiving, by an event decoder, one or more interrupt signals from one or more interrupt sources;
decoding, by the event decoder, a received interrupt signal to produce control data relating to an interrupt event;
receiving, by one or more sequencers, said control data from the event decoder;
retrieving, by the one or more sequencers, one or more steps of a sequence from a sequence memory, the sequence memory for storing one or more sequences, a sequence comprising one or more steps for handling one or more interrupt events; and
interpreting, by the one or more sequencers, said retrieved one or more steps.

* * * * *